Aug. 8, 1950 G. R. JOHNSON 2,517,673
WHEEL BLOCK
Filed July 25, 1946 2 Sheets-Sheet 1
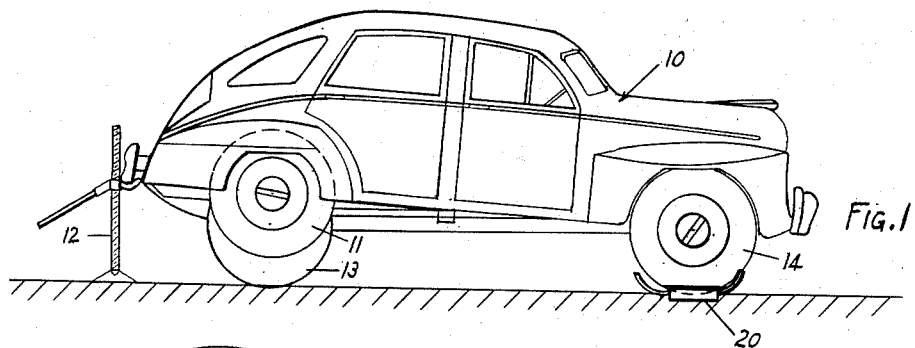
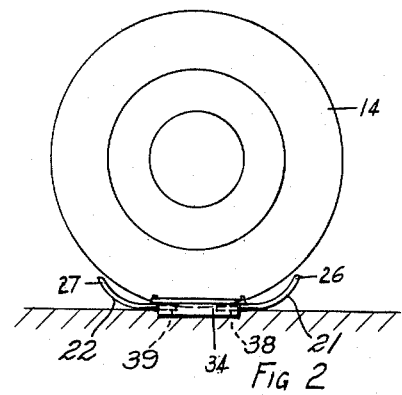
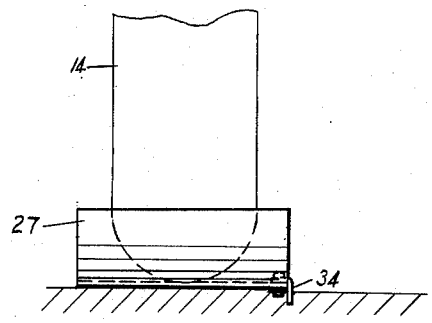
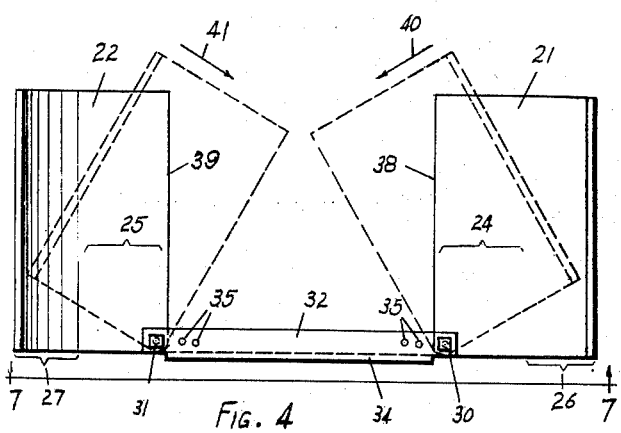
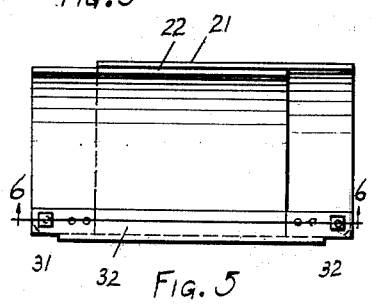
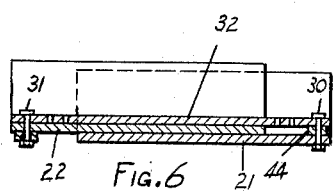
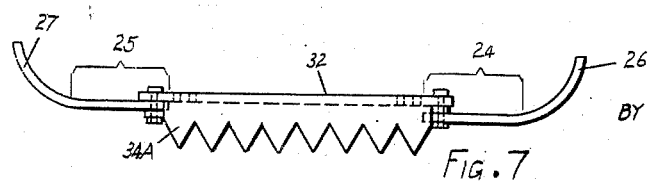
INVENTOR
GUY R. JOHNSON
BY Paul, Paul & Moore
ATTORNEYS Aug. 8, 1950   G. R. JOHNSON   2,517,673
WHEEL BLOCK
Filed July 25, 1946   2 Sheets-Sheet 2

INVENTOR
GUY R. JOHNSON
BY Paul, Paul & Moore
ATTORNEYS

Patented Aug. 8, 1950

2,517,673

UNITED STATES PATENT OFFICE 2,517,673

WHEEL BLOCK

Guy R. Johnson, Rochester, Minn.

Application July 25, 1946, Serial No. 686,211

11 Claims. (Cl. 188—32)

This invention relates to wheel blocks and more particularly to a wheel block suitable for use in holding a rubber-tired vehicle of the automative type against movement when another of the wheels of the vehicle is elevated by means of a bumper jack. When utilizing a bumper jack, the jack is placed under the bumper of the vehicle and the vehicle is elevated to a considerable height so as to lift the wheel off the ground. Many accidents have occurred when using bumper jacks, due to the fact that the relatively great elevation of the vehicle necessary when using a bumper jack causes the vehicle to tend to side-slip, and to move endwise. Since the bumper jack is not usually firmly secured to the bumper and is relatively tall, even a slight movement of the vehicle endways or sideways is likely to cause the jack to slide on the bumper and let the vehicle down, sometimes with disastrous results.

It is an object of the present invention to provide an improved wheel block capable of holding a vehicle of the automotive type against endwise movement and to supply an appreciable holding force against sideways movement. It is a further object of the invention to provide an improved wheel block capable of being folded away into a small space and to provide a wheel block capable of being manufactured at low cost with a minimum of materials.

Other and further objects of the invention are those inherent in the apparatus herein illustrated, described, and claimed.

The invention is illustrated with reference to the drawings, in which

Figure 1 illustrates an automobile having one wheel lifted by means of a bumper jack and a wheel block of the present invention in place on another wheel;

Figures 2 and 3 are side and end elevational views, respectively, the latter being somewhat enlarged, of one of the wheels of a vehicle showing the wheel block of the present invention in place;

Figure 4 is a plan view of the wheel block removed from the vehicle, but showing the wheel block in full lines in the position in which the parts would be used when in wheel blocking condition. Figure 4 also shows, in dotted lines, an intermediate position of several of the parts;

Figure 5 is a plan view showing the wheel block folded to nesting condition for stowing and shipping;

Figure 6 is a side elevational view, partly in section, taken along the lines 6—6 of Figure 5;

Figure 7 is a side elevational view of the wheel block taken in the direction of arrows 7—7 of Figure 4 and illustrating a slightly modified form of the invention;

Figure 8:
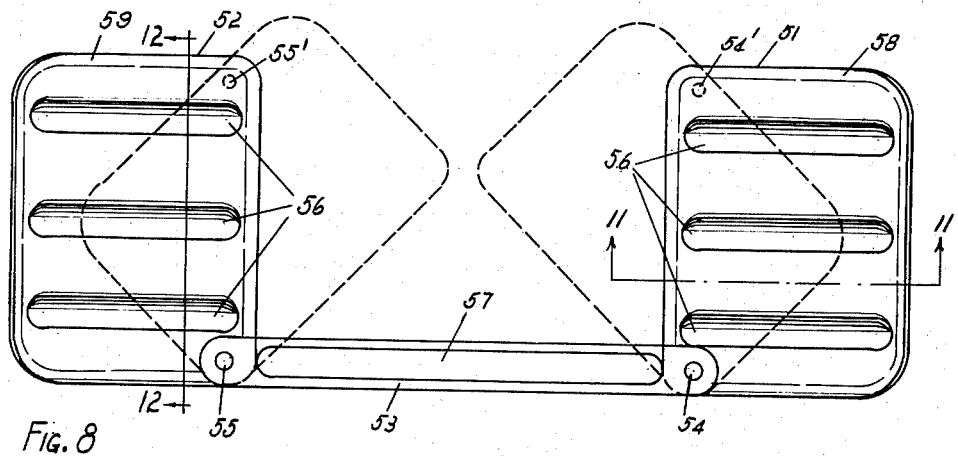
Figure 9:
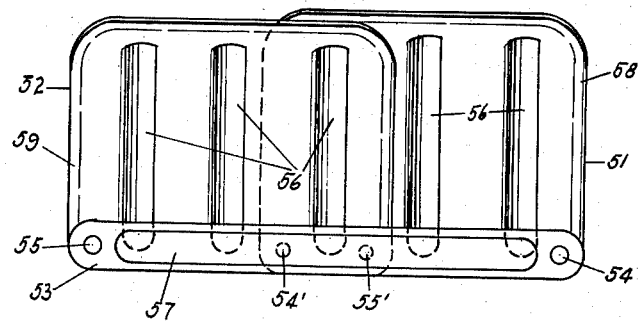
Figure 10:
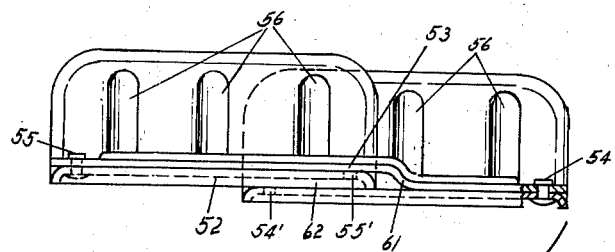
Figure 12:
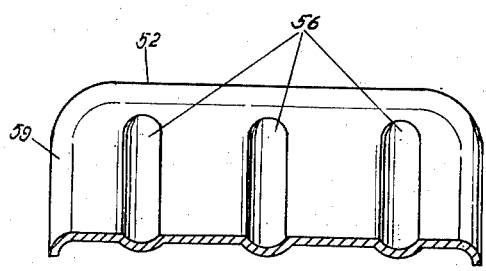
Figure 11:
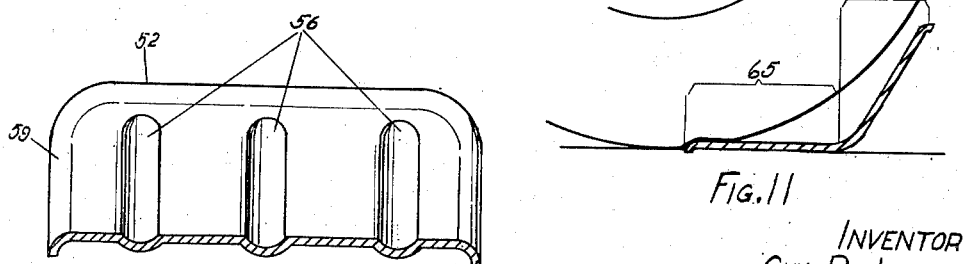

Figures 8, 9, 10, 11 and 12 illustrate a slightly modified and preferred commercial form of the invention, Figure 8 being a plan view and showing in full lines the position of the wheel block as it would be in wheel blocking condition; Figure 9 being a plan view showing the wheel block in folded condition; Figure 10 being a side elevational view; Figure 11 being a fragmentary sectional view taken in the direction of arrows 11—11 of Figure 8; and Figure 12 being a sectional view taken in the direction of arrows 12—12 of Figure 8.

Referring to the drawings, in Figure 1 there is illustrated an automotive vehicle generally designated 10. In this instance the right rear tire 11 of the vehicle is assumed to have gone flat and it is desired to elevate the same, which is done by means of a bumper jack of usual type shown at 12. The left rear wheel of the vehicle illustrated at 13 remains on the ground. In order to prevent movement of the vehicle during the jacking operation, the wheel block of the present invention generally designated 20 is placed under the right front wheel 14.

Referring to Figures 2-7 the wheel block consists of a pair of plates 21 and 22 which are preferably of identical form. The plates have portions 24 and 25, Figure 7, which normally engage the ground during the blocking operation and a curved upper portion 26 and 27 at each edge which will engage the tire of the vehicle, so as to prevent the wheel from rolling in either direction. The wheel block plates 21 and 22 are pivotally attached by means of bolts or rivets 30 and 31 to a tie bar or link 32 which may have downwardly extending edge portion 34, as shown in Figures 2 and 4. This edge portion serves to engage the surface of the highway upon which the device is used and assists in preventing side-slip of the wheel block. If desired, the downwardly extending portion 34 may be serrated as indicated at 34A in Figure 5, so as to make the gripping action more positive where the device is to be used in snow or loose dirt. The tie bar 32 may, if desired, be provided with a plurality of holes 35, so as to allow change of position of plates 21 with reference to plate 22, thereby permitting the wheel block to be used with wheels of varying outside diameters. As shown in Figure 2, the wheel block is placed so that the normal ground engaging portion of the tire 36 will engage the inner or adjacent edges 38 and 39 of the plates 21 or 22 thereby holding the plates tightly in engagement with the road bed. In practice the plates 21 and 22 are so spaced by the tire bar 32 that they may be slipped beneath the wheel, the edges 38 and 39 just clearing the lower tread surface of the tire. The plates are thus so positioned (see Fig. 2) that if the wheel rolls either forward or rearward the slightest distance it will press the edge of one of the plates firmly against the roadway and then come up against the upturned edge 26 or 27, as the case may be, to prevent further movement. The vehicle is thus firmly held against rolling such as might cause the jack to slip as will be readily understood.

When it is desired to remove the wheel block the vehicle may be driven either forwardly or backwardly a very slight amount so as to center it with respect to the block which may then be removed without difficulty. The pivotal connection of the plates to the tie bar 32 facilitates both engagement and disengagement since one plate may be pushed in beneath the wheel, or worked out from therebeneath, and then the other will be readily maneuverable as required.

When it is desired to stow the wheel block the plates 21 and 22 are pivoted in the direction of arrows 40 and 41 with respect to the tie bar 32 through the dotted line position shown in Figure 4 to the position shown in Figure 5. In this position there is an overlap of plates, in this instance the free end of plate 22 being overlapped over the free end of plate 21. It will be noted with reference to Figure 6 that the plate 21 is preferably spaced from the tie bar 32 by means of a spacing washer as indicated at 44. The spacing washer is preferably made of a thickness approximately equal to the thickness of the plates 21 and 22 so that the plates nest freely without imposing any bending strain upon the pivoting bolts or rivets 30 and 31.

Referring to Figures 8-12 there is illustrated a desirable commercial form of the invention which is substantially identical with that form of the invention shown in Figures 1-7 but has some slight modifications so as to improve the strength and operation of the device. Thus, as shown in Figures 8-12, the wheel blocking plates 51 and 52 are pivotally attached to a tie bar or link 53 by means of pivot rivets 54 and 55. The plates 51 and 52 are preferably identical and accordingly are punched at both corners as indicated at 54—54' and 55—55'. The punching of the plates at both corners makes them identical and permits them to be manufactured without troubling about rights or lefts, and thus facilitates both the manufacture and assembly of the device.

Both the plates 51 and 52 are provided with reinforcing beading so as to improve the stiffness and the strength of the plate and link. Thus, plates 51 and 52 have reinforcing corrugations 56 and the link 53 has a reinforcing corrugation 57. In addition, the plates 51 and 52 each have their marginal edges rolled down as indicated at 58 and 59 which not only stiffens the plate but also presents a downwardly engaging edge which facilitates the gripping of the plate to the road bed upon which it is applied as will be seen in Fig. 11. It will be noted in Figure 10 that the link 53 is provided with a bend at 61 which presents an offset sufficient to permit the plate 52 to be nested in the space 62. This obviates the necessity of a spacing washer such as washer 44 of Figure 6. The bent up portion of the plates 58 and 59 is illustrated in Figure 11 wherein it will be observed that the bent up portion is shown under the bracket 64, whereas the ground engaging portion is shown under the bracket 65. The use of the apparatus shown in Figures 8-12 is the same as that previously described with reference to Figures 1-7.

As many apparently widely different embodiments of this invention may be made without departing from the spirit and scope thereof, it is to be understood that I do not limit myself to the specific embodiments herein except as defined by the appended claims.

What I claim is:

1. A wheel block mechanism comprising a pair of plates each having a ground engaging portion and an upwardly extending portion, a connection link, said plates being each attached to the connection link with the ground engaging portions directed towards each other and the upwardly extending portions away from each other, said plates being pivotally mounted on the connection link so as to be swingable to a position in which the plates are aligned end for end and partially nested.

2. A wheel block mechanism comprising a pair of plates each having a ground engaging portion and an upwardly bent edge portion, said plates being positionable when in use so as to extend across in front and in back of a wheel of the automobile type with the wheel resting on ground engaging portions and with at least a portion of the circumference of the wheel bearing against the bent up edge, and a tie bar pivotally attached to the edges of the ground engaging plates and extending alongside the wheel, said plates being pivoted in respect to the tie bar so as to fold to generally aligned position lengthwise of the bar with an end portion of one plate nested under the end portion of the other plate.

3. A wheel block mechanism comprising a pair of plates each having a ground engaging portion and an upwardly extending portion, a connection link, said plates being each attached to the connection link with the ground engaging portions directed towards each other and the upwardly extending portions away from each other, and said plates being pivotally mounted on the connection link so as to be swingable to a position in which the plates are aligned end for end and partially nested, the said plates being more than half as long as the connection link.

4. A wheel block mechanism comprising a pair of plates each having a ground engaging portion and an upwardly extending portion, a connection link, said plates being each attached to the connection link with the ground engaging portions directed towards each other and the upwardly extending portions away from each other, and said plates being pivotally mounted on the connection link so as to be swingable to a position in which the plates are aligned end for end and partially nested, the said connection link having a downwardly directed portion for gripping the surface on which it is placed.

5. A wheel block mechanism comprising a pair of plates each having a ground engaging portion and an upwardly extending portion, a connection link, said plates being each attached to the connection link with the ground engaging portions directed towards each other and the upwardly extending portions away from each other, and said plates being pivotally mounted on the connection link so as to be swingable to a position in which the plates are aligned end for end and partially nested, the said connection link having a downwardly directed serrated edge portion for gripping the surface on which it is placed.

6. A wheel block mechanism comprising a pair of plates each having a ground engaging portion and an upwardly extending portion, a connection link, said plates being each attached to the connection link with the ground engaging portions directed towards each other and the upwardly extending portions away from each other, and said plates being pivotally mounted on the connection link so as to be swingable to a position in which the plates are aligned end for end and partially nested, one of the plates being pivoted in spaced relationship to the connection link so as to facilitate overlap of the plates when they are moved to nested positions.

7. A wheel block mechanism comprising a pair of plates each having a ground engaging portion and an upwardly extending portion, a connection link, said plates being each attached to the connection link with the ground engaging portions directed towards each other and the upwardly extending portions away from each other, members pivotally mounting the plates on the connection link so as to be swingable to a positon in which the plates are aligned end for end and partially nested, the said link having a plurality of openings for the selective reception of said members pivoting the plates to permit spacing adjustments of the plates.

8. A wheel block mechanism comprising a pair of plates each having a ground engaging portion and an upwardly bent edge portion, said plates being positionable when in use so as to extend across in front and in back of a wheel of the automobile type with the wheel resting on ground engaging portions and with at least a portion of the circumference of the wheel bearing against the bent up edge, and a tie bar pivotally attached to the edges of the ground engaging plates and extending alongside the wheel, said plates being pivoted in respect to the tie bar so as to fold to generally aligned position lengthwise of the bar with an end portion of one plate nested under the end portion of the other plate, the said plates having reinforcing corrugations.

9. A wheel block mechanism comprising a pair of plates each having a ground engaging portion and an upwardly bent edge portion, said plates being positionable when in use so as to extend across in front and in back of a wheel of the automobile type with the wheel resting on ground engaging portions and with at least a portion of the circumference of the wheel bearing against the bent up edge, and a tie bar pivotally attached to the edges of the ground engaging plates and extending alongside the wheel, said plates being pivoted in respect to the tie bar so as to fold to generally aligned position lengthwise of the bar with an end portion of one plate nested under the end portion of the other plate, the said plates having turned down edges for stiffening the plates and for engaging the surface upon which the plates rest to thereby hold the plates against slipping on that surface.

10. Means for blocking a vehicle wheel, comprising a pair of spaced plates positionable ahead of and behind the wheel and having upwardly turned portions and ground portions extending toward each other, the said plates being so proportioned and so spaced that the wheel will first engage the ground engaging portion of either plate as it rolls toward the upturned end thereof and prior to contacting said upturned end to thereby hold the plate on the ground without slippage, and means for holding the plates in properly spaced relation.

11. Means of the character described for blocking a vehicle wheel, a pair of plates having oppositely extending ground engaging portions terminating in upwardly turned wheel engaging portions an adapted to be placed respectively forwardly and rearwardly of the wheel, and means for holding the plates in spaced relation such that the vehicle wheel will bear on the edges of their ground engaging portions holding them to the ground whereby said upwardly turned portions will restrain the wheel against rolling, the said edges of the ground engaging portions of the plates having downwardly turned means for gripping the ground surface.

GUY R. JOHNSON.

REFERENCES CITED

The following references are of record in the file of this patent:

UNITED STATES PATENTS

| Number | Name | Date |
| --- | --- | --- |
| 1,047,048 | Harrison | Dec. 10, 1912 |
| 1,276,430 | Smith | Aug. 20, 1918 |
| 2,491,989 | Lind | Dec. 20, 1949 |